United States Patent [19]

Wepner et al.

[11] Patent Number: 4,457,197
[45] Date of Patent: Jul. 3, 1984

[54] DEVICE FOR CUTTING AND/OR STAMPING METAL BARS AND SECTIONS

[75] Inventors: Joachim Wepner, Gevelsberg; Hubert Barysch, Ennepetal; Erwin Kruse, Gevelsberg, all of Fed. Rep. of Germany

[73] Assignee: Rolf Peddinghaus, Ennepetal, Fed. Rep. of Germany

[21] Appl. No.: 351,593

[22] Filed: Feb. 23, 1982

[30] Foreign Application Priority Data

Feb. 26, 1981 [DE] Fed. Rep. of Germany ....... 3107199

[51] Int. Cl.³ ............................................. B23D 23/00
[52] U.S. Cl. ........................................ 83/197; 83/198; 83/561; 83/620; 83/639; 83/698
[58] Field of Search ................. 83/196, 197, 198, 199, 83/200, 509, 549, 560, 599, 613, 618, 620, 639, 561, 622; 72/464, 324, 332; 29/564

[56] References Cited

U.S. PATENT DOCUMENTS

| | | | |
|---|---|---|---|
| 1,374,223 | 4/1921 | Paque | 83/618 |
| 2,112,153 | 3/1938 | Gorham | 83/618 |
| 3,391,591 | 7/1968 | Funke | 83/198 |
| 3,668,919 | 6/1972 | Hongo | 83/618 |
| 3,750,509 | 8/1973 | Kruse | 83/198 |
| 3,913,372 | 10/1975 | Baker | 72/324 |
| 4,116,122 | 9/1978 | Linder et al. | 83/639 |

FOREIGN PATENT DOCUMENTS

| | | | |
|---|---|---|---|
| 77956 | 11/1894 | Fed. Rep. of Germany | 83/198 |
| 866442 | 7/1949 | Fed. Rep. of Germany | 164/58 |

Primary Examiner—Frank T. Yost
Assistant Examiner—L. Knoble
Attorney, Agent, or Firm—Holman & Stern

[57] ABSTRACT

A device for cutting or stamping metal bars and sections comprising a machine frame having a slide which is guided for movement in a frame and which is driven in the direction of its length by an hydraulic or pneumatic drive which applies a driving force substantially along the longitudinal center line of the slide, a pair of tools one of which is connected to the machine frame, the other being carried by the slide, said pair of tools being laterally offset relatively to the line of application of the driving force, and the machine frame being provided with laterally spaced guides both above and below the tools for guiding said movement of the slide. An additional force is applied to the slide to oppose the torque which in use will be generated by the force couple which is formed by the aforesaid driving force applied by the hydraulic or pneumatic drive and the cutting or stamping reaction force which will be developed in use by the pair of tools.

5 Claims, 2 Drawing Figures

DEVICE FOR CUTTING AND/OR STAMPING METAL BARS AND SECTIONS

BACKGROUND OF THE INVENTION

1. Field of the Invention

The invention relates to a device for cutting and/or stamping metal (e.g. steel) bars and sections, said device being of the kind comprising a machine frame adapted to support one tool of a pair of tools with a slide guided therein which slide is driven in the direction of its length and is adapted to carry the other tool of said pair of tools, which pair of tools is laterally offset relative to the effective line of application of the driving force, laterally spaced guides being provided on the machine frame above and below the tools for guiding the movement of the slide and an hydraulic or pneumatic drive for the slide being provided to act substantially in the longitudinal center line of the slide.

2. Description of the Prior Art

A device of this kind is known from German Patent Specification AS No. 25 33 153, published Jan. 27, 1977. Owing to the considerable distance between the lines of effective application of the driving force and the cutting reaction force, the guideways are subjected to considerable stress when the device is in operation which entails a correspondingly high degree of wear. Eventually, due to such heavy wear, the cuts, or stampings can no longer be sufficiently precisely executed and expensive re-dressing work is required on the device. Wear nearly always leads to a one-sided position of the slide due to the force-couple of driving force and cutting reaction force, and to the distance by which these forces are spaced apart, resulting in wear at diagonally opposite guide regions.

BRIEF SUMMARY OF THE INVENTION

It is the object of the present invention to further develop a device of the kind specified in the sense of enabling it to be operated for substantially longer periods of service without having to incur the added expense of regrinding or replacing the guides. The invention stems from the observation that in those regions which are not subjected to stress loads by the one-sided tilt of the slide the respectively affected guide faces of tool slide and machine frame suffer comparatively little wear.

According to the present invention, there is provided a device of the kind specified wherein there is provided means which apply an additional force to the slide to oppose the torque moment which is generated by the force couple formed by the driving force and the cutting or stamping reaction force developed in use by said pair of tools.

In this way it is possible either very substantially to reduce guide clearance directly during cutting or stamping or at any rate, if the proposed additional means are not applied simultaneously to the slide during cutting or stamping operations, to achieve a very substantial decrease in guide wear.

In a particularly attractive embodiment of the invention the said additional means consist of a saddle part which carries one of the tools and is itself mounted on a rocker member, the latter being hinged to the machine frame for pivotal movement about an axis which intersects the plane of the force couple and having one of its sides adapted to act as a guide face to the slide. By means of this rocker member the actual cutting or stamping force itself is used to oppose the tilting tendency of the slide in as much as the guide face of the rocker member lies against such a part of the slide that in use the rocker member will tend to push the slide in the opposite direction to that direction in which the slide would tend to tilt under the effect of the cutting or stamping force itself. In other words, the rocker member effectively applies a powerful force to the slide only and exclusively during the actual cutting or stamping process.

According to another proposal of the invention the additional means consist of a further set of tools which are arranged on that side of the effective driving force line which is opposite the original set of tools. The concept of this arrangement is based on the consideration that a device which is equipped with two sets of tools arranged one on either side of the effective driving force application line, is also liable to be used for work which involves the actual use of both sets of tools. This means that in the course of longer periods of machine service all guide-face areas or regions suffer practically the same amount of wear so that the total service life of the machine is correspondingly prolonged. For example, if identical working tools are provided on both sides of the slide, the equal application, or use, of both sets of tools will eventually afford a considerably longer wear-free operation period than would for example correspond to double the service life of a single set of tools provided on one side of the slide only. In this context it is important to remember that wear processes increase progressively with time.

In both embodiments of the invention it is an advantage if the hydraulic or pneumatic drive of the slide is effectively applied in the lower part of the device because this affords substantially improved guide precision corresponding to decreased tilting tendency.

Whereas the rocker member actively influences the guideways when a load is applied to the associated set of tools as hereinbefore described, it also tends to 'give', or yield in the case of a further load application in which further tools are actuated which could cause the slide to cant, or tilt towards the rocker member. Primarily such further tools may be cutter blades in the vicinity of the longitudinal center line of the slide which, on actuation, generate reaction forces which are again spaced away from the effective driving force application line and therefore liable to set up a torque component. In that event, in order to avoid undesired deflection of the rocker member, it is an advantage to limit rocker movement by the provision of an end stop on that side thereof which is opposite the guide face. Such an end stop may also quite easily be constructed as an adjustable end stop thereby providing a precision adjustment facility for the device.

A particularly even guide-pressure, or support for the slide can be obtained if a part-spherical segment is mounted in that side of the rocker member which is directed towards the slide and the plane side of such a segment is arranged directly adjacent and abutting the slide. Such a part-spherical segment will always adjust itself flush with the flat surface to be guided thereby and therefore entail a lower specific area compression load.

If the driving force is generated by means of a cylinder secured to the machine frame and the associated extendable piston rod applies a downwardly directed force to the slide for the working stroke thereof, a particularly high operative stroke force can be obtained because in such an arrangement the pressure medium can be applied to the whole of the piston face area in the operative stroke. By contrast, for the return stroke the pressure medium application to the relatively smaller annular area between piston section and piston rod section is quite enough.

The provision of further tools in the vicinity of the longitudinal center line of the slide is also known from German AS No. 25 33 153. In order to be able to make precise cuts with the aid of such further tools it is of special advantage to make use of the facility provided by the guide face of the rocker member of the present invention.

To this end the slide is provided with a cutter plate of which the cutting edge is inclined downwardly at an angle of about 45° relative to the line of effective driving force application in a direction away from the rocker member which carries the tool-saddle, the profile-receiving window aperture being provided in the counter-plate. Preferably this aperture will comprise intersecting vertical and horizontal slots for the introduction of angle sections. The horizontal limbs of such angle sections would be pointing away from the rocker member thus allowing take-up of cutting-reaction force on the guide faces opposite the rocker member and its spherical segment. Such an arrangement also preserves the previously known advantage of being able to feed angle sections also obliquely in the horizontal plane for executing mitre-cuts.

BRIEF DESCRIPTION OF THE DRAWINGS

For a further detailed description of the invention reference will be made to the accompanying schematic drawings wherein.

DETAILED DESCRIPTION

Figure 1:
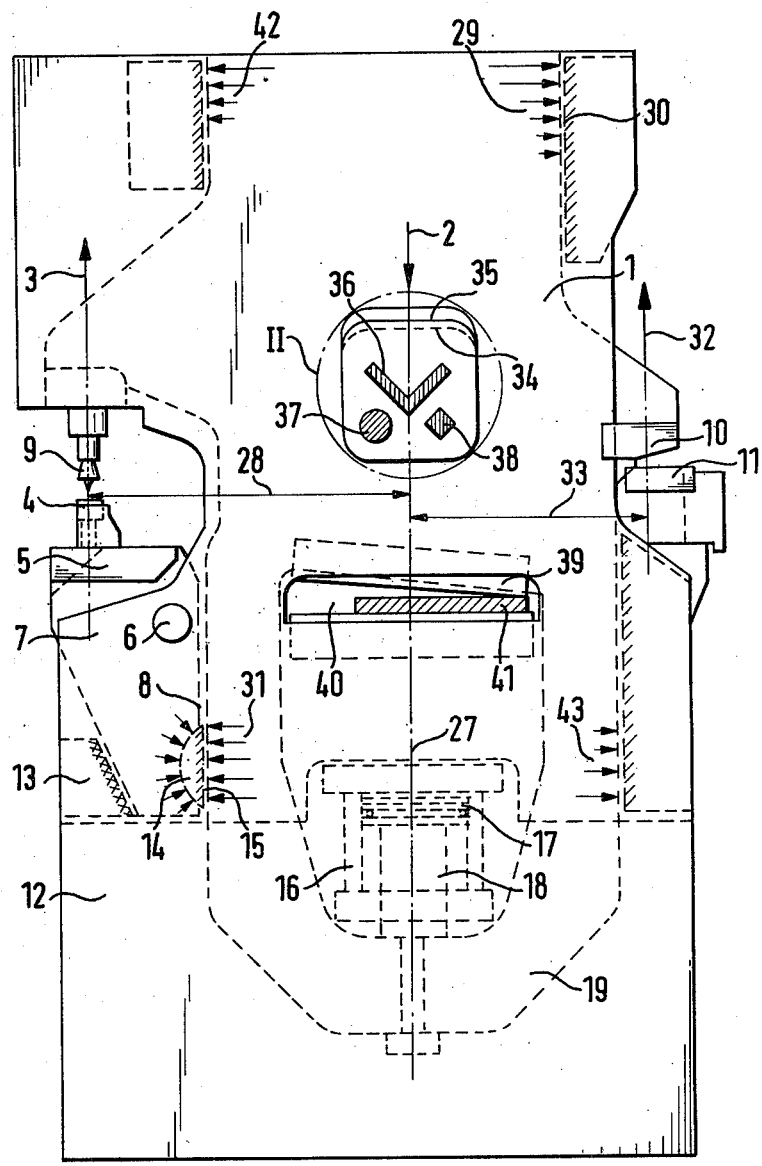
FIG. 1 is an elevational view of part of one example of a device according to this invention.

FIG. 1 shows a slide 1 which in use is guided, and also driven in the vertical direction, in an upright machine frame 12. Its bottom portion 19 is connected to a piston rod 18 anchored therein, the associated piston 17 working in a cylinder 16 under pressure-medium application, the cylinder 16 being mounted on the machine frame 12. When pressure medium is admitted to the upper end of cylinder 16 the slide 1 is displaced in the downward direction, the effective line of application of the driving force 2 coinciding with the longitudinal center line 27 of the slide 1. The drawing further shows a set of co-acting tools which is laterally offset relative to the effective line of driving force application 2 by distance 28 and comprises a female die, or matrix 4 on a saddlepiece 5 and a male die or punch 9 mounted on a projecting part of the slide 1 above the matrix 4. When a metal (e.g. steel) work-piece is stamped or punched out, a reaction force 3 is generated which, with driving force 2, forms a force-couple whereof the torque moment is determined in part by the value of the said distance 28 between the force components. Due to this torque the slide 1 seeks to assume an inclined position bearing on the one side in direction of arrows 29 on the right-hand upper guide face 30 of the machine frame 12 and on the other side in the direction of arrows 31 on the left-hand bottom guide face 8. The latter is equipped with a rocker member 7 which is mounted for rocking or pivotal movement about an axis 6. This axis 6 is perpendicular to the plane of the force couple 2, 3. The rocker member 7 includes the saddle piece 5 which carries the female die or matrix 4. In order to guarantee a precisely flat area contact between the rocker member 7 and the slide 1, the latter has a part-spherical segment 14 of which the flat or plane side 15 is designed to take up the load at the guide face of slide 1.

FIG. 1 further shows another set of tools 10, 11 on the other side of the effective driving force application line 2 consisting of a lower and an upper cutting blade. The lower blade 11 is fitted in the machine frame 12 whereas the upper blade 10 is mounted on the slide 1. Here the cutting stroke sets up a reaction force 32 which, due to the given distance 33 between the line of said reaction force 32 and the line 2 of effective driving force application generates a torque moment pushing the slide in the direction of the upper, 42, and lower, 43 arrows against diagonally opposite guide faces on the machine frame 12. Thus, when this further set of tools 10, 11 is actuated, the rocker member 7 itself as well as the generated torque tend to tilt the slide 1 in its lower part towards the right-hand side.

Additionally to the tools 4, 9 and 10, 11, the device may be provided with further tools in the region of the longitudinal center line 27. Such further tools may take the form, for example, of a cutter plate 34 secured to the slide 1 and a counter plate 35 secured in the machine frame, the latter plate being provided with suitable passage windows 36, 37, 38 to receive steel or other metal sections and bars of various cross-sectional shapes.

The slide 1 may further carry a shear-blade 39 adapted to be displaced behind a work-receiving window 40 in the machine frame 12 and designed, for example, to cut flat bar sections 41. The width of this window 40 is conveniently equal to double the lateral overhang of the tool set 4, 9 so that flat steel sections of width up to the width of the window can be cut in a single pass and can then be provided by the tool set 4, 9 with stamped or punched holes across the whole of their width in two passes.

Figure 2:
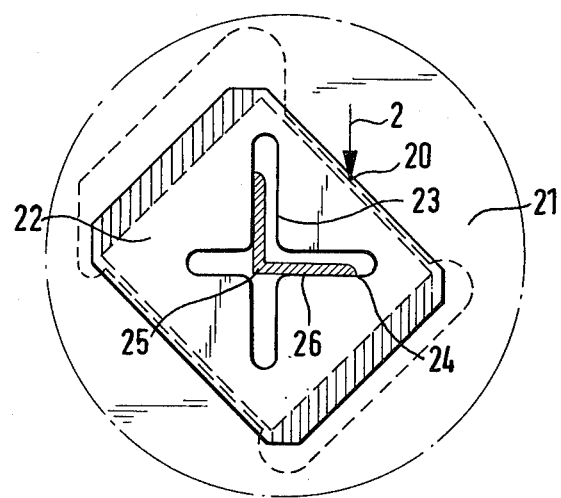
FIG. 2 is a view of the area II in FIG. 1 but on a slightly larger scale and in a modified form.

FIG. 2 shows (on a larger scale) a particularly attractive modified embodiment of the cutter plate and counter plate until featured inside the circle II in FIG. 1. As shown in FIG. 2, an angle section 25 is engaged in a vertical-horizontal position in the correspondingly intersecting slots 23, 24 of the work-receiving aperture in a blade-holder plate 22; the horizontal leg 26 must point away from rocker member 7. In region 21 the slide has a cutting edge 20 which extends at an anble of 45° relative to the effective driving force application line 2 in a direction away from the rocker member. The blade-holder plate has slot openings or windows which correspond configurationally to the workpiece angle section and it is removable between the guides of the counter-blade shown hatched in the drawing. In the course of execution of the cutting stroke the cutting force tends to displace the slide to the right-hand side so that it will press against the right-hand upper and lower guide faces without deflecting the rocker member 7. In order to limit the deflection of rocker member 7 during the return stroke and also in order to enable a precise guide adjustment to be obtained, an end stop 13 which is adapted to make plane area contact with the rocker member 7 is provided on the machine frame 12. Any convenient means for adjusting said end stop 13 is provided but is not illustrated in the drawing.

We claim:

1. A device for stamping metal bars and sections comprising a machine frame adapted to support one tool of a pair of tools, a slide guided in said frame driven in the direction of its length and adapted to carry the other tool of said pair of tools, a hydraulic drive means operatively connected to said slide to apply driving force substantially in the longitudinal center line of the slide, said pair of tools being laterally offset relative to the effective line of application of the driving force, laterally spaced guides on the machine frame above and below said tools for guiding the movement of said slide, and means to apply an additional force to the slide to oppose the torque moment generated by the force couple formed by the driving force and the stamping reaction force developed in use by said pair of tools comprising, a rocker member hinged to the machine frame and having a side which is adapted to serve as a guide face abutting the slide, and a saddle mounted on said rocker member, said one tool of the pair of tools being mounted on said saddle.

2. A device according to claim 1 and further comprising an end stop provided on the machine frame on the side of the rocker member opposite to said guide face thereof to limit the deflection of the rocker member.

3. A device according to claim 2, wherein the end stop is adjustable.

4. A device according to claim 1 and further comprising a part-spherical segment having a plane side inserted in the rocker member so that its plane side abuts the slide and forms said guide face.

5. A device according to claim 1 and further comprising a cutting edge on said slide in the region of its longitudinal center line, a blade-holder plate mounted in the machine frame, aperture means in said blade-holder plate designed to receive sections to be sheared, said cutting edge being inclined to the line of application of the driving force at an angle of about 45° in a downwards direction away from said rocker member, the section-receiving aperture means in the blade holder plate comprising mutually crossing vertical and horizontal receiving slots for the insertion therethrough of angle sections with their horizontal limb directed away from the rocker member.

* * * * *